United States Patent [19]

Plichta et al.

[11] Patent Number: 5,154,990
[45] Date of Patent: Oct. 13, 1992

[54] RECHARGEABLE SOLID LITHIUM ION ELECTROCHEMICAL SYSTEM

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 824,809

[22] Filed: Jan. 21, 1992

[51] Int. Cl.$^5$ .......................... H01M 6/18; H01M 4/58
[52] U.S. Cl. ..................................... 429/191; 429/218; 429/220; 429/223
[58] Field of Search ............... 429/193, 191, 197, 218, 429/223, 220

[56] References Cited

U.S. PATENT DOCUMENTS

| | | | |
|---|---|---|---|
| 4,066,824 | 1/1978 | Rao et al. | 429/191 X |
| 4,075,397 | 2/1978 | Francis et al. | 429/191 X |
| 4,302,518 | 11/1981 | Goodenough et al. | 429/191 X |
| 4,340,652 | 7/1982 | Raistrick et al. | 429/218 X |
| 4,668,593 | 5/1987 | Sammells | 429/191 |
| 4,804,596 | 2/1989 | Ebner et al. | 429/194 |
| 4,980,080 | 12/1990 | Lecerf et al. | 429/223 X |
| 4,983,476 | 1/1991 | Slane et al. | 429/218 X |

Primary Examiner—John S. Maples
Attorney, Agent, or Firm—Michael Zelenka; Roy E. Gorgon

[57] ABSTRACT

A rechargeable solid state lithium ion electromechanical system is provided that can be operated at moderately high temperatures of about 100° C. and that uses a lithiated transition metal oxide cathode, a lithium intercalating transition metal sulfide anode, and a lithium ionically conductive solid electrolyte.

11 Claims, 3 Drawing Sheets

RECHARGEABLE SOLID LITHIUM ION ELECTROCHEMICAL SYSTEM

GOVERNMENT INTEREST

The invention described herein may be manufactured, used, and licensed by or for the Government for governmental purposes without the payment to use of any royalty thereon.

FIELD OF INVENTION

This invention relates in general to a lithium rechargeable electrochemical system, and in particular to a rechargeable solid state lithium ion electrochemical system.

BACKGROUND OF THE INVENTION

Lithium rechargeable batteries typically utilize a lithium intercalating transition metal oxide or sulfide cathode, a lithium metal anode, and an electrolyte containing a lithium salt in an aprotic solvent. These cells generally are capable of efficient operation at temperatures ranging from $-40°$ C. to $55°$ C. where temperature of operation is limited by the physical properties of the electrolyte. However, the problem associated with these cells is that the metallic lithium anode does not recharge efficiently thus limiting cycle life. Lithium is also inherently prone to deleterious reactions with the organic based electrolytes especially at temperatures above $50°$ C. Attempts to substitute the lithium anode with a lithium intercalcating anode have been demonstrated. Although this eliminated the problems associated with the lithium metal anode, it did not result in cells having much improved cycle life. The reason is that these cells utilize liquid lithium-organic solvent electrolytes that are known to form strongly solvated ionic species in solution. These relatively large solvated ions are co-intercalated with the smaller lithium ions into the host intercalating electrode structures during cycling that irreversibly damages these intercalating materials, resulting in diminished cell cycle life. Also, the use of liquid electrolytes has prevented the development of bipolar rechargeable lithium batteries for higher power applications since a bipolar cell design requires each cell to be individually sealed in order to contain the liquid component. This negates the effective and reliable use of the bipolar design that is to improve the power density of the electrochemical system.

SUMMARY OF THE INVENTION

The general object of this invention is to provide a lithium rechargeable electrochemical system that can be operated at moderately high temperature of about $100°$ C. A more particular object of the invention is to provide such a system as a safe rechargeable high energy density power source having excellent cycle life, component stability, and low cost. Another object of the invention is to provide such a system that will be used in a bipolar battery configuration as a low volume power source for electronic equipment, electric vehicle propulsion, robotics as well as general portable devices requiring a high power density battery.

It has now been found that the aforementioned objects can be attained by providing a rechargeable lithium solid state electrochemical system including a lithiated transition metal oxide cathode, a transition metal chalcogenide anode, and a lithium ionically conductive solid electrolyte operated at moderately high temperatures.

More particularly, it has been found that a $Li_xTiS_2/LiAlCl_4/Li_{1-x}CoO_2$ solid state cell can produce desired results when operated at temperatures ranging up to the melting point of the electrolyte or about $140°$ C. A typical cell configuration includes the use of the following procedures: The electrodes are prepared by thin film deposition of the $LiCoO_2$ cathode and $TiS_2$ anodes onto conductive metal foil current collectors in which the active materials can have a thickness between 20 and 10 microns.

The electrolyte layer is prepared in situ from molten $LiAlCl_4$ by sandwiching a porous glass fiber separator between the $LiCoO_2$ cathode and $TiS_2$ anode electrodes followed by immersion into molten $LiAlCl_4$. The time required for wetting the separator is dependent upon the melt temperature and the area of the separator to be wetted. Typically, a 1 $cm^2$ surface area cell requires one minute in a melt of $LiAlCl_4$ at $180°$ C. to provide suitable separator wetting. After wetting the electrolyte, the cell is removed from the molten $LiAlCl_4$ and quenched in an inert atmosphere to room temperature to minimize any disassociation reactions that may occur at the electrodes. The cooled cell is then reheated to a temperature below the melting point of the electrolyte ($LiAlCl_4$ mp$=143°$ C.) and operated between a cell voltage of 2.3% to 0V in order to minimize any electrolyte oxidation or reduction reactions. The $Li_xTiS_2/LiAlCl_4/Li_{1-x}CoO_2$ solid state cell uses an electrolyte layer thickness of 0.02 cm and is operated at $100°$ C. The ionic conductivity of $LiAlCl_4$ at $100°$ C. is observed to $5.4 \times 10^{-5} Scm^{-1}$.

Figure 1:
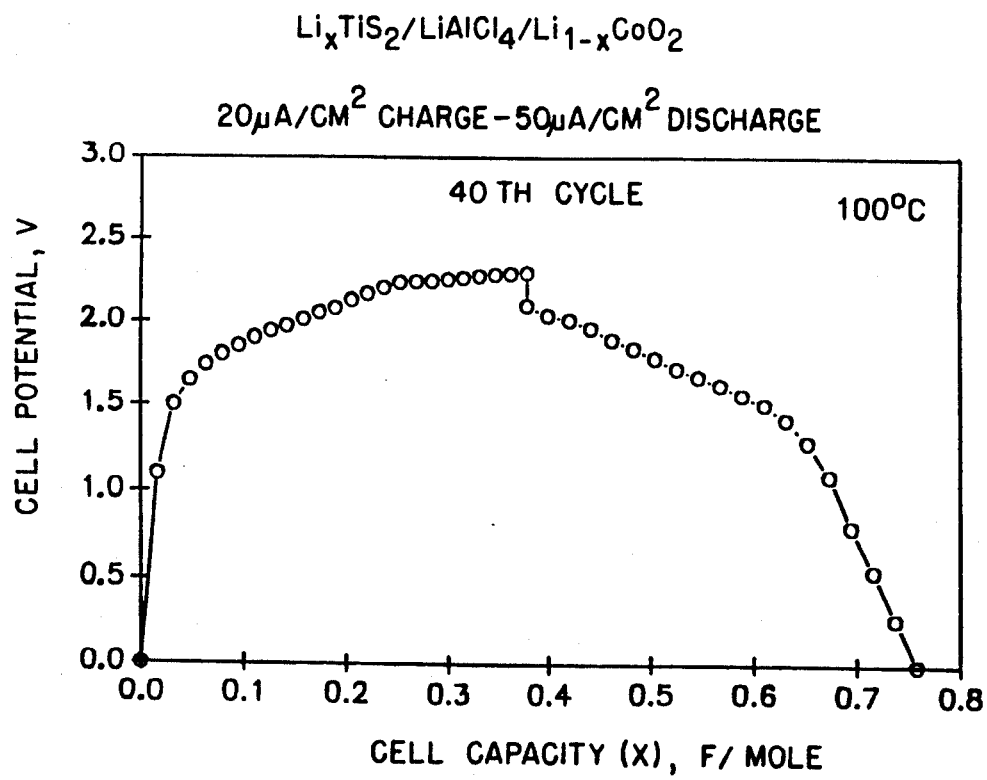
FIG. 1 represents a typical cell polarization cycle as a function of capacity for the $Li_xTiS_2/LiAlCl_4/Li_{1-x}CoO_2$ solid state cell operated at constant current.
Figure 2:
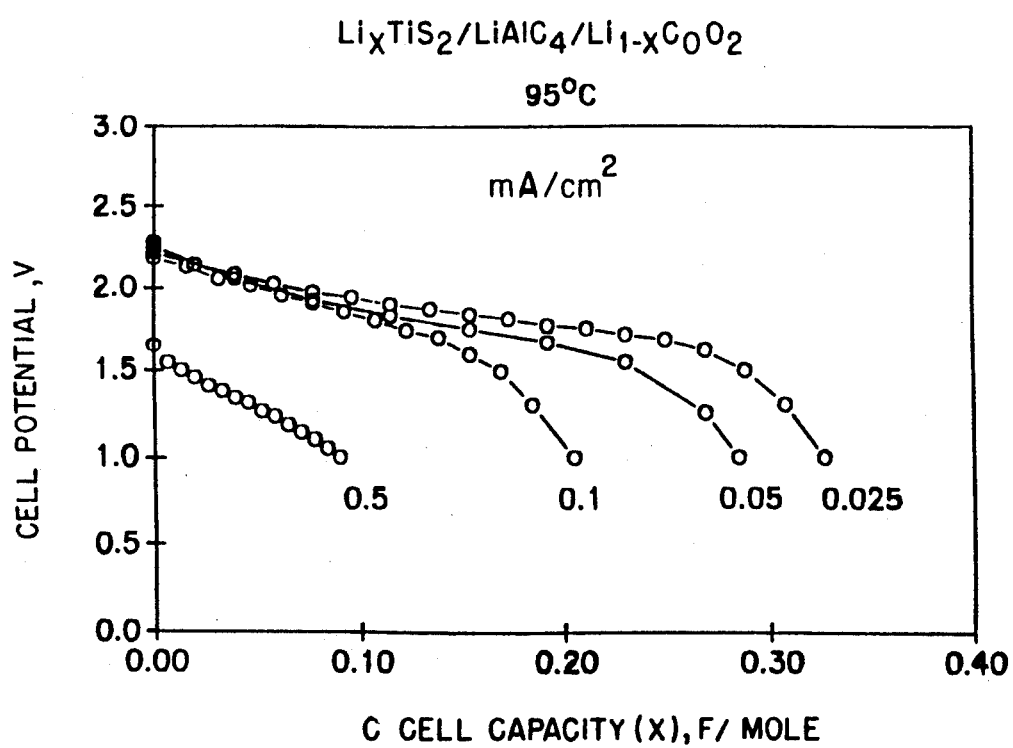
FIG. 2 represents the cell polarization as a function of discharge current density.

The $Li_xTiS_2/LiAlCl_4/Li_{1-x}CoO_2$ solid state rechargeable cell has a theoretical energy density based upon the active materials $TiS_2$ and $LiCoO_2$ of 115 Wh/kg of 1.80 volts assuming 0.5 F/mole capacity or 50% cathode utilization. This performance is demonstrated in FIG. 1 where 0.34 F/mole is reversible obtained at an average discharge potential of 1.66V. The initial open circuit voltage of this cell is 0.5V at $100°$ C. The rate capabilities of the $Li_xTiS_2/LiAlCl_4/Li_{1-x}CoO_2$ solid state cell are illustrated in FIG. 2 for an electrolyte thickness of 0.02 cm. Since the electrolyte layer is formed in situ from molten $LiAlCl_4$, the electrolyte thickness is dependent upon the separator thickness. Use of thinner gauge separators by those skilled in the art would enable higher current densities to be achieved. Other separator materials such as fabrics, felts, fibers or powders of ceramics, polymers, or glasses can also be used.

Figure 3:
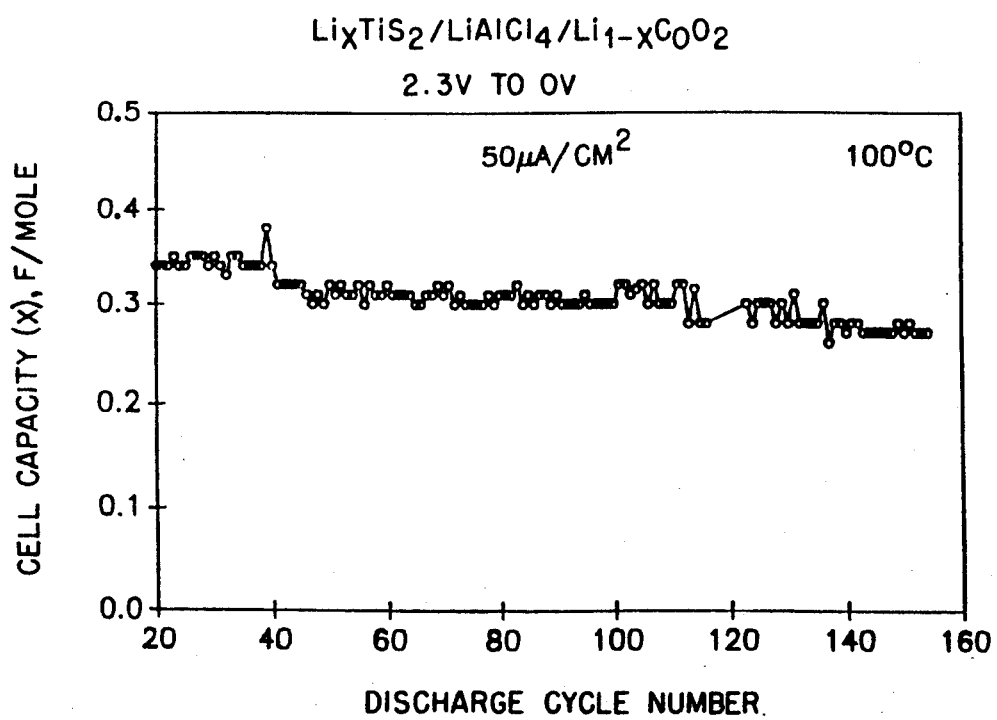
FIG. 3 illustrates the cell capacity as a function of discharge cycle number obtained for the $Li_xTiS_2/LiAlCl_4/Li_{1-x}CoO_2$ solid state cell. The charging current is maintained at 20 $\mu A/cm^2$.

The excellent cycle life achievable with this $Li_xTiS_2/LiAlCl_4/Li_{1-x}CoO_2$ solid state cell is presented in FIG. 3, where the charge current density is maintained at 20 $\mu A/cm^2$. Since only lithium ions are being intercalated and deintercalated at each electrode, the volume expansions of the electrode lattice structures are relatively small compared to those cells containing lithium-organic solvent electrolytes.

In the lithium-organic solvent electrolytes there are strongly solvated ionic species that tend to irreversibly cointercalate into the electrode lattice structure resulting in significant capacity losses. Since the solid state cell operates only through the diffusion of lithium ions, this effect is not present. In addition, the use of other lithium intercalating materials can be used as anodes in lieu of $TiS_2$ with the $LiAlCl_4$ solid electrolyte such as $VSe_2$, $MoS_2$, $TaS_2$, $TiS_2$ $NbSe_3$, CuS, and $RuO_2$. Other lithiated transition metal oxide materials can be used as the cathode in lieu of $LiCoO_2$ with the $LiAlCl_4$ solid electrolyte such as $Li_xNiO_2$, $Li_xMnO_2$, $Li_xV_2O_5$, $Li_xCr_3O_8$, $Li_xCr_2O_5$, and $Li_xMoO_3$.

A solid state rechargeable battery as described herein offers advantages over currently available lithium rechargeable cells. Since there is no metallic lithium present in the cell, the effects of dendritic lithium shorting, passivation reactions, and related safety problems are negated. In addition, a rechargeable solid state battery offers advantages over a primary solid state battery in that a reuseable power source is more cost efficient. Also, the use of an all solid state system enables the development of a reduced volume bipolar battery design without the need of the individually sealed cells required for cells using liquid components. In addition, the $Li_xTiS_2/LiAlCl_4/Li_{1-x}CoO_2$ cell is a safe and efficient cell chemistry capable of delivering high energy and power densities.

We wish it to be understood that we do not desire to be limited to the exact details of construction shown and described for obvious modifications will occur to a person skilled in the art.

What is claimed is:

1. A rechargeable solid state lithium ion electrochemical system including a transition metal chalcogenide as the anode, a lithiated transition metal oxide as the cathode, and a lithium ion conducting solid as the electrolyte.

2. A rechargeable solid state lithium ion electrochemical system according to claim 1 wherein the lithium ion conducting solid electrolyte is $LiAlCl_4$.

3. A rechargeable system according to claim 1 wherein the anode is selected from the group consisting of $TiS_2$, $VSe_2$, $MoS_2$, $TaS_2$, $TiSe_2$, $NbSe_3$, CuS and $RuO_2$.

4. A rechargeable system according to claim 3 wherein the anode is $TiS_2$.

5. A rechargeable system according to claim 3 wherein the anode is $VSe_3$.

6. A rechargeable system according to claim 1 wherein the lithiated cathode is selected from the group consisting of $LiCoO_2$, $LiNiO_2$, $Li_xMnO_2$, $Li_xV_2O_5$, $Li_xCr_3O_8$, $Li_xCr_2O_5$, and $Li_xMoD_3$.

7. A rechargeable system according to claim 6 wherein the lithiated cathode is $LiCoO_3$.

8. A rechargeable system according to claim 6 wherein the lithiated cathode is $LiNiO_2$.

9. A rechargeable solid state lithium ion electrochemical system including $TiS_2$ as the anode, $LiCoO_2$ as the cathode, and $LiAlCl_4$ as the lithium ion conducting solid electrolyte.

10. A rechargeable solid state lithium ion electrochemical system including $VSe_2$ as the anode, $LiCoO_2$ as the cathode, and $LiAlCl_4$ as the lithium ion conducting solid electrolyte.

11. A rechargeable solid state lithium ion electrochemical system including $TiS_2$ as the anode, $LiNiO_2$ as the cathode, and $LiAlCl_4$ as the lithium ion conducting solid electrolyte.

* * * * *